US012746838B2

(12) United States Patent
Keblanz

(10) Patent No.: US 12,746,838 B2
(45) Date of Patent: Sep. 29, 2026

(54) ROBOTIC WORK TOOL AND ROBOTIC TOOL SYSTEM

(71) Applicant: HUSQVARNA AB, Huskvarna (SE)

(72) Inventor: Rolf Keblanz, Månsarp (SE)

(73) Assignee: HUSQVARNA AB, Huskvarna (SE)

( * ) Notice: Subject to any disclaimer, the term of this patent is extended or adjusted under 35 U.S.C. 154(b) by 751 days.

(21) Appl. No.: 18/136,552

(22) Filed: Apr. 19, 2023

(65) Prior Publication Data

US 2023/0339350 A1 Oct. 26, 2023

(30) Foreign Application Priority Data

Apr. 22, 2022 (SE) .................................... 2250481-5

(51) Int. Cl.

| | |
|---|---|
| ***H01M 10/46*** | (2006.01) |
| ***A01D 34/00*** | (2006.01) |
| ***B60L 53/12*** | (2019.01) |
| ***B60L 53/38*** | (2019.01) |
| *A01D 101/00* | (2006.01) |

(52) U.S. Cl.

CPC ............ *B60L 53/38* (2019.02); *A01D 34/008* (2013.01); *B60L 53/12* (2019.02); *A01D 2101/00* (2013.01)

(58) Field of Classification Search

CPC ........... H02J 7/00; H02J 7/0042; Y02T 10/70; Y02T 90/14; Y02T 10/7072; B60L 53/16; A01D 2101/00

USPC ................................ 320/104, 107, 114, 115

See application file for complete search history.

(56) References Cited

U.S. PATENT DOCUMENTS

| | | | | |
|---|---|---|---|---|
| 10,873,194 B2 * | 12/2020 | Lydon | H02J 7/70 | |
| 11,345,250 B2 * | 5/2022 | Schwartz | B60L 53/36 | |
| 2003/0094922 A1 | 5/2003 | Petersson et al. | | |
| 2007/0142964 A1 * | 6/2007 | Abramson | A01D 34/008 | 700/245 |

(Continued)

FOREIGN PATENT DOCUMENTS

| | | | |
|---|---|---|---|
| CN | 201562735 U * | 8/2010 | H01M 4/32 |
| CN | 104124730 A | 10/2014 | |
| CN | 204037374 U | 12/2014 | |

(Continued)

OTHER PUBLICATIONS

Machine translation of CN104124730A (Oct. 29, 2014) (Year: 2014).*

(Continued)

*Primary Examiner* — Edward Tso

(74) *Attorney, Agent, or Firm* — Burr & Forman

(57) ABSTRACT

A robotic work tool (1) is disclosed configured to operate in an area in an autonomous manner. The robotic work tool (1) comprises one or more rechargeable batteries (5) and a contact plate (3) configured to transfer electricity from a contact (4) of a docking station (8) to the one or more rechargeable batteries (5). The contact plate (3) comprises an edge surface (3') configured to abut against the contact (4) of the docking station (8) upon movement of the robotic work tool (1) relative to the docking station (8) along a docking direction (d1). The contact plate (3) comprises a number of sections (s1-s5, b1-b4) each being angled relative to the docking direction (d1). The present disclosure further relates to a robotic tool system (10) comprising a robotic work tool (1) and a docking station (8).

15 Claims, 3 Drawing Sheets

(56) References Cited

U.S. PATENT DOCUMENTS

| | | | |
|---|---|---|---|
| 2014/0203764 | A1 | 7/2014 | Ireland |
| 2020/0130523 | A1 | 4/2020 | Wendeborn et al. |

FOREIGN PATENT DOCUMENTS

| | | | | |
|---|---|---|---|---|
| CN | 108918173 | A | | 11/2018 |
| CN | 109906747 | A | * | 6/2019 |
| EP | 2679084 | A1 | | 1/2014 |
| EP | 3354124 | A1 | | 8/2018 |
| JP | 2001095736 | A | | 4/2001 |
| WO | 2011044803 | A1 | | 4/2011 |
| WO | 2015108454 | A1 | | 7/2015 |
| WO | 2020014025 | A1 | | 1/2020 |
| WO | 2021147312 | A1 | | 7/2021 |

OTHER PUBLICATIONS

Swedish Search Report in Swedish patent application No. 2250481-5, dated Nov. 8, 2022.

Electrical Design for Ferrous Metal Mining Enterprises References, Changsha Ferrous Metal Mining Design Institute, Metallurgical Industry Press, pp. 167-168, dated Mar. 31, 1979.

* cited by examiner

ROBOTIC WORK TOOL AND ROBOTIC TOOL SYSTEM

TECHNICAL FIELD

The present disclosure relates to a robotic work tool configured to operate in an area in an autonomous manner. The robotic work tool comprises one or more rechargeable batteries and a contact plate configured to transfer electricity from a contact of a docking station to the one or more rechargeable batteries. The present disclosure further relates to a robotic tool system comprising a robotic work tool and a docking station.

BACKGROUND

Self-propelled robotic work tools, such as self-propelled autonomous robotic lawnmowers, have become increasingly popular, partly because they usually are capable of performing work which previously was made manually. A self-propelled robotic work tool is capable of navigating in an area in an autonomous manner, i.e., without the intervention or the direct control of a user. The robotic work tool may move in a systematic and/or random pattern to ensure that the area is completely covered. Some robotic work tools require a user to set up a border wire around an area that defines the area to be operated by the robotic work tool. Such robotic work tools use a sensor to locate the wire and thereby the boundary of the area to be operated.

As an alternative, or in addition, robotic work tools may comprise other types of positioning units and sensors, for example sensors for detecting an event, such as a collision with an object within the area and/or a satellite-based positioning unit. A satellite-based positioning unit typically utilize a space-based satellite navigation system, such as a Global Positioning System (GPS), The Russian GLObal NAvigation Satellite System (GLONASS), European Union Galileo positioning system, Chinese Compass navigation system, or Indian Regional Navigational Satellite System to provide a current position estimate of the robotic work tool. Generally, robotic work tools operate unattended within the area in which they operate. Examples of such areas are lawns, gardens, parks, sports fields, golf courts and the like.

Usually, a robotic work tool comprises a control arrangement configured to navigate the robotic work tool based on input from one or more of the above-mentioned types of positioning units and sensors. Moreover, a robotic work tool usually comprises one or more batteries configured to supply electricity to one or more electric propulsion motors of the robotic work tool and/or one or more electrically driven tools, such as one or more cutting units.

After a certain operation time, the one or more batteries of the robotic work tool must be recharged. This is normally done in a docking station. Typically, the control arrangement of the robotic work tool navigates the robotic work tool to the docking station when the one or more batteries is to be recharged, such as when the state of charge (SOC) level of the batteries is below a threshold state of charge. In some cases, the robotic work tool uses a wire to locate the docking station but may as an alternative, or in addition, use one or more other types of positioning units and/or sensors to locate the docking station, such as one or more of the above-mentioned types.

A robotic work tool is usually sold to a consumer in a kit comprising the robotic work tool and a docking station adapted to charge the one or more batteries of the robotic work tool. Such a kit can also be referred to as a robotic work tool system. The docking station usually comprises a charging unit provided with a number of electrical contacts and the robotic work tool normally comprises a number of electrical contact plates configured to abut against the electrical contacts of the docking station to receive electricity therefrom to charge the one or more batteries of the robotic work tool. Thus, when the robotic work tool is near the docking station, the robotic work tool is to perform a docking procedure in which the robotic work tool is moved along a docking direction relative to the docking station to obtain electrical contact between the electrical contact plates of the robotic work tool and the electrical contacts of the docking station.

A robotic work tool may operate in dirty environments, such as in outdoor environments, and matter, such as dust, debris, cutting residues, and the like, can accumulate onto contact plates of the robotic work tool. Such matter is usually pressed against and pushed along the contact plate of the robotic work tool. The matter accumulates over time which eventually can be enough to isolate the contact plate of the robotic work tool from the contact of the docking station. If the contact plate of the robotic work tool is isolated from the contact of the docking station, there will be a lack of electrical contact. Furthermore, over time, oxidation layers may be formed on contact plates of robotic work tools and on contacts of docking stations which may cause a lack of electrical contact even when a robotic work tool is docked into a docking station.

The lack of electrical contact between a contact plate of a robotic work tool and a contact of a docking station may cause a standstill of the robotic work tool. This is because the lack of electrical contact leads to an inability to charge the one or more batteries of the robotic work tool and which consequently interrupts autonomous operation of the robotic work tool system. Obviously, such situations may annoy a user of a robotic work tool system because the robotic work tool will not be able to perform its task, such as cutting grass.

Moreover, generally, on today's consumer market, it is an advantage if products, such as robotic work tools and associated components, systems, and arrangements, are operational reliable, and have conditions and/or characteristics suitable for being manufactured in a cost-efficient manner.

SUMMARY

It is an object of the present invention to overcome, or at least alleviate, at least some of the above-mentioned problems and drawbacks.

According to a first aspect of the invention, the object is achieved by a robotic work tool configured to operate in an area in an autonomous manner. The robotic work tool comprises one or more rechargeable batteries and a contact plate configured to transfer electricity from a contact of a docking station to the one or more rechargeable batteries. The contact plate comprises an edge surface extending along an abutment plane. The edge surface is configured to abut against the contact of the docking station upon movement of the robotic work tool relative to the docking station along a docking direction. The contact plate comprises a number of sections each being angled relative to the docking direction.

Since the contact plate comprises the number of sections each being angled relative to the docking direction, a contact area between the contact plate and the contact of the docking station will move in a direction perpendicular to the docking direction upon movement of the robotic work tool along the docking direction relative to the docking station. As a result thereof, any matter, such as dirt, debris, and cutting residues on the edge surface of the contact plate, and/or on the contact of the docking station, can be scraped off and can be removed during the movement of the robotic work tool in the docking direction relative to the docking station. In this manner, an electrical contact between the contact plate and the contact of the docking station can be further ensured.

Furthermore, due to the number of sections of the contact plate each being angled relative to the docking direction, a more evenly distributed wear and tear of contact of the docking station can be provided.

Moreover, the number of sections each being angled relative to the docking direction lower the probability of an abutting contact between the edge surface of the contact plate and an unused and oxidized area of the contact of the docking station when the robotic work tool stops after movement in the docking direction. In this manner, an electrical contact between the contact plate and the contact of the docking station can be further ensured.

Thus, due to the features of the contact plate of the robotic work tool, a robotic work tool is provided in which electrical contact between the contact plate thereof and a contact of the docking station can be further ensured in a simple and cost-efficient manner. As a further result, a robotic work tool is provided having conditions for an improved operational reliability in a simple and cost-efficient manner.

Accordingly, a robotic work tool is provided overcoming, or at least alleviating, at least some of the above-mentioned problems and drawbacks. As a result, the above-mentioned object is achieved.

Optionally, each section of the number of sections is angled relative to the docking direction with an angle measured in a plane parallel to the abutment plane. Thereby, a contact area between the contact plate and the contact of the docking station will move in a direction perpendicular to the docking direction and in a direction parallel to the abutment plane upon movement of the robotic work tool relative to the docking station along the docking direction. As a result thereof, any matter, such as dirt, debris, and cutting residues on the edge surface of the contact plate, and/or on the contact of the docking station, can be scraped off and can be removed in an efficient manner during the movement of the robotic work tool in the docking direction relative to the docking station.

Thereby, an electrical contact between the contact plate and the contact of the docking station can be further ensured. Furthermore, a more evenly distributed wear and tear of contact of the docking station can be provided. As a further result, a robotic work tool is provided having conditions for a further improved operational reliability in a simple and cost-efficient manner.

Optionally, the contact plate comprises a number of bent sections. Thereby, any matter, such as dirt, debris, and cutting residues on the edge surface of the contact plate, and/or on the contact of the docking station, can be scraped off and can be removed in an efficient manner during movement of the robotic work tool in the docking direction relative to the docking station. Moreover, a contact plate is provided having conditions and characteristics suitable for being manufactured in a cost-efficient manner while having conditions for ensuring electrical contact between the contact plate and the contact of the docking station.

Optionally, each bent section of the number of bent sections has a radius of curvature measured in a plane parallel to the abutment plane. Thereby, any matter, such as dirt, debris, and cutting residues on the edge surface of the contact plate, and/or on the contact of the docking station, can be scraped off and can be removed in an efficient manner during movement of the robotic work tool in the docking direction relative to the docking station. In this manner, an electrical contact between the contact plate and the contact of the docking station can be further ensured. Moreover, a more evenly distributed wear and tear of contact of the docking station can be provided. As a further result, a robotic work tool is provided having conditions for an improved operational reliability in a simple and cost-efficient manner.

Optionally, the contact plate comprises at least two straight sections and at least one bent section, and wherein each bent section of the at least one bent section connects two straight sections of the least two straight sections. Thereby, it can be further ensured that any matter on the edge surface of the contact plate, and/or on the contact of the docking station, can be scraped off and can be removed during movement of the robotic work tool in the docking direction relative to the docking station. As a result, an electrical contact between the contact plate and the contact of the docking station can be further ensured. Furthermore, a more evenly distributed wear and tear of contact of the docking station can be provided. Moreover, a contact plate is provided having conditions and characteristics suitable for being manufactured in a cost-efficient manner.

Optionally, the contact plate comprises at least three straight sections and at least two bent sections, and wherein each bent section of the at least two bent sections connects two straight sections of the least three straight sections. Thereby, it can be further ensured that any matter on the edge surface of the contact plate, and/or on the contact of the docking station, can be scraped off and can be removed during movement of the robotic work tool in the docking direction relative to the docking station. As a result, an electrical contact between the contact plate and the contact of the docking station can be further ensured. Furthermore, a more evenly distributed wear and tear of contact of the docking station can be provided. Moreover, a contact plate is provided having conditions and characteristics suitable for being manufactured in a cost-efficient manner.

Optionally, the thickness of the contact plate is less than 10% of the length of the edge surface, measured in a direction parallel to the docking direction. Thereby, it can be further ensured that any matter on the edge surface of the contact plate, and/or on the contact of the docking station, can be scraped off and can be removed in an efficient manner during movement of the robotic work tool in the docking direction relative to the docking station. As a result, an electrical contact between the contact plate and the contact of the docking station can be further ensured.

Optionally, the edge surface is configured such that a contact area between the contact plate and the contact of the docking station moves a first distance along a direction perpendicular to the docking direction upon the movement of the robotic work tool in the docking direction relative to the docking station, and wherein the first distance is greater than, or equal to, a thickness of the contact plate. Thereby, it can be even further ensured that any matter on the edge surface of the contact plate, and/or on the contact of the docking station, can be removed in an efficient manner during movement of the robotic work tool in the docking direction relative to the docking station. As a result, an electrical contact between the contact plate and the contact of the docking station can be further ensured.

Optionally, the edge surface is substantially parallel to the docking direction. Thereby, a robotic work tool is provided having conditions for a high probability of obtaining an electrical contact between the contact plate of the robotic work tool and the contact of the docking station in a docking procedure of the robotic work tool into the docking station.

Optionally, the abutment plane is substantially parallel to the docking direction. Thereby, a robotic work tool is provided having conditions for a high probability of obtaining an electrical contact between the contact plate of the robotic work tool and the contact of the docking station in a docking procedure of the robotic work tool into the docking station.

Optionally, the docking direction is substantially parallel to a longitudinal direction of the robotic work tool. Thereby, a robotic work tool is provided having conditions for a simple and efficient docking procedure while obtaining a high probability of obtaining an electrical contact between the contact plate of the robotic work tool and the contact of the docking station.

Optionally, the abutment plane is substantially parallel to a lateral direction of the robotic work tool. Thereby, it can be further ensured that any matter on the edge surface of the contact plate, and/or on the contact of the docking station, can be scraped off and can be removed during movement of the robotic work tool in the docking direction relative to the docking station.

Optionally, the robotic work tool is a self-propelled robotic lawnmower. Thereby, due to the features of the contact plate of the robotic lawnmower, a robotic lawnmower is provided in which electrical contact between the contact plate thereof and a contact of the docking station can be further ensured in a simple and cost-efficient manner. As a further result, a robotic lawnmower is provided having conditions for an improved operational reliability in a simple and cost-efficient manner.

According to a second aspect of the invention, the object is achieved by a robotic tool system comprising a robotic work tool and a docking station, wherein the robotic work tool is configured to operate in an area in an autonomous manner. The robotic work tool comprises one or more rechargeable batteries and a contact plate configured to transfer electricity from a contact of the docking station to the one or more rechargeable batteries. The contact plate comprises an edge surface extending along an abutment plane. The edge surface is configured to abut against the contact of the docking station upon movement of the robotic work tool relative to the docking station along a docking direction. The contact plate comprises a number of sections each being angled relative to the docking direction.

Since the contact plate comprises the number of sections each being angled relative to the docking direction, a contact area between the contact plate and the contact of the docking station will move in a direction perpendicular to the docking direction upon movement of the robotic work tool relative to the docking station along the docking direction. As a result thereof, any matter, such as dirt, debris, and cutting residues on the edge surface of the contact plate, and/or on the contact of the docking station, can be scraped off and can be removed during movement of the robotic work tool in the docking direction relative to the docking station. In this manner, an electrical contact between the contact plate and the contact of the docking station can be further ensured.

Furthermore, due to the number of sections each being angled relative to the docking direction, a more evenly distributed wear and tear of contact of the docking station can be provided.

Moreover, the number of sections each being angled relative to the docking direction lower the probability of an abutting contact between the edge surface of the contact plate and an unused and oxidized area of the contact of the docking station when the robotic work tool stops after movement in the docking direction. In this manner, an electrical contact between the contact plate and the contact of the docking station can be further ensured.

Thus, due to the features of the contact plate of the robotic work tool, a robotic tool system is provided in which electrical contact between the contact plate of the robotic work tool and the contact of the docking station can be further ensured in a simple and cost-efficient manner. As a further result thereof, a robotic tool system is provided having conditions for an improved operational reliability in a simple and cost-efficient manner.

Accordingly, a robotic tool system is provided overcoming, or at least alleviating, at least some of the above-mentioned problems and drawbacks. As a result, the above-mentioned object is achieved.

Optionally, the contact of the docking station comprises an abutment section having a radius of curvature of less than 8 mm, or less than 4 mm, measured in a plane perpendicular to the abutment plane. Thereby, due to the relatively small radius of curvature of the abutment section of the contact of the docking station, any matter, such as dirt, debris, and cutting residues on the edge surface of the contact plate of the robotic work tool can be scraped off in a more efficient manner and can be removed during movement of the robotic work tool in the docking direction relative to the docking station. Thereby, an electrical contact between the contact plate of the robotic work tool and the contact of the docking station can be further ensured.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout.

Well-known functions or constructions will not necessarily be described in detail for brevity and/or clarity.

Figure 1:
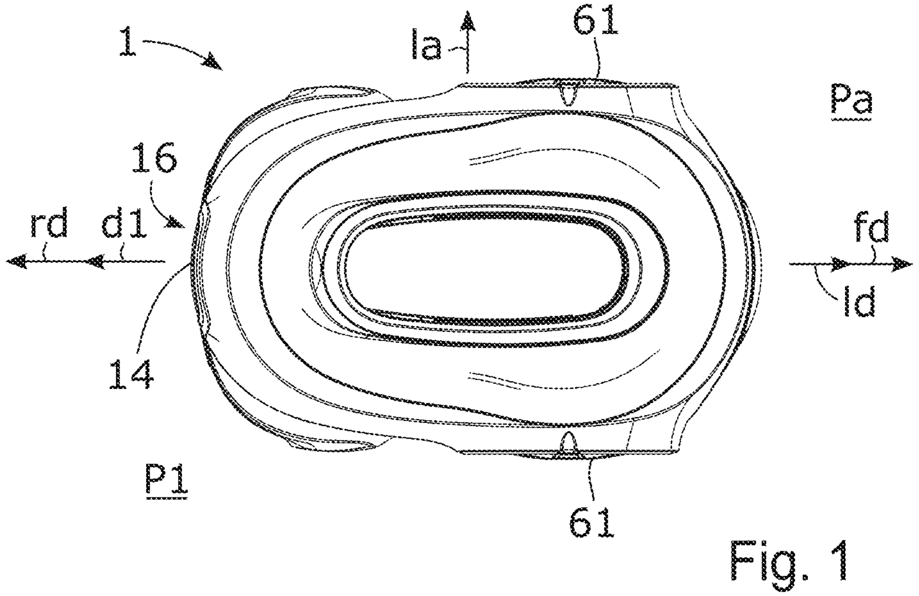
FIG. 1 illustrates a top view of a self-propelled robotic work tool according to some embodiments.

FIG. 1 illustrates a top view of a self-propelled robotic work tool 1 according to some embodiments of the present disclosure. For reasons of brevity and clarity, the self-propelled robotic work tool 1 is in some places herein referred to as "the robotic tool 1." According to the illustrated embodiments, the robotic work tool 1 is a self-propelled robotic lawnmower, i.e., a robotic lawnmower capable of navigating and cutting grass in an autonomous manner in an area without the intervention or the control of a user. Moreover, according to the illustrated embodiments, the robotic work tool 1 is a small or mid-sized robotic lawnmower configured to be used to cut grass in areas used for aesthetic and recreational purposes, such as gardens, parks, city parks, sports fields, lawns around houses, apartments, commercial buildings, offices, and the like.

According to further embodiments, the robotic work tool 1, as referred to herein, may be another type of robotic work tool capable of navigating and operating an area in an autonomous manner without the intervention or the control of a user, such as for example a street sweeper, a snow removal tool, a mine clearance robot, or any other robotic work tool that is required to operate in a work area in a methodical and systematic or position oriented manner.

Figure 2:
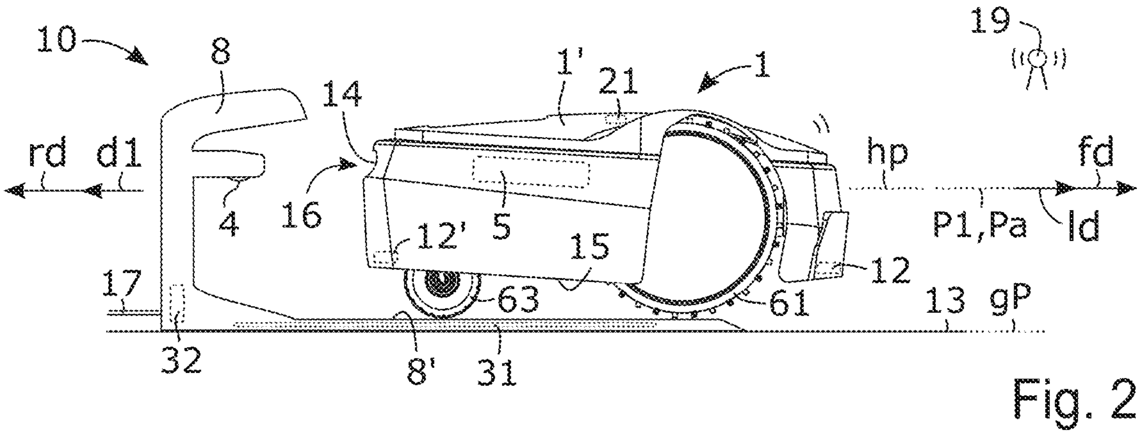
FIG. 2 illustrates a robotic tool system according to some embodiments.

FIG. 2 illustrates a robotic tool system 10 according to some embodiments. The robotic tool system 10 comprises a robotic work tool 1 and a docking station 8. The robotic tool system 10 may also be referred to as a robotic work tool system 10. As is indicated in FIG. 2, the robotic work tool 1 comprises a rechargeable battery 5. According to further embodiments, the robotic work tool 1 may comprise a number of rechargeable batteries 5. As is further explained herein, the docking station is configured to charge the one or more rechargeable batteries 5 of the robotic work tool 1.

Below, simultaneous reference is made to FIG. 1-FIG. 2, if not indicated otherwise. The robotic work tool 1 comprises a tool chassis 1' and a number of tool support members 61, 63 attached to the tool chassis 1'. Each tool support member 61, 63 is configured to abut against a ground surface 13 in a ground plane gP during operation of the robotic work tool 1 to support the tool chassis 1' relative to the ground surface 13. Accordingly, the ground plane gP extends along a ground surface 13 when the robotic work tool 1 is positioned on a flat ground surface 13.

According to the illustrated embodiments, the tool support members 61, 63 are wheels 61, 63 of the robotic work tool 1. According to the illustrated embodiments, the robotic work tool 1 comprises four wheels 61, 63, namely two drive wheels 61 and two support wheels 63. The drive wheels 61 of the robotic work tool 1 may each be powered by an electrical motor of the robotic work tool 1 to provide motive power and/or steering of the robotic work tool 1. Such electric motors may be arranged on the tool chassis 1' of the robotic work tool 1, as is further explained herein.

Moreover, in FIG. 1 and FIG. 2, a longitudinal direction 1*d* of the robotic work tool 1 is indicated. The longitudinal direction 1*d* of the robotic work tool 1 extends in a longitudinal plane of the robotic work tool 1. The longitudinal plane is parallel to a ground plane gP when the robotic work tool 1 is positioned in an upright use position on a flat ground surface 13. The longitudinal direction 1*d* of the robotic work tool 1 is thus parallel to the ground plane gP and thus also to a ground surface 13 when the robotic work tool 1 is positioned onto a flat ground surface 13. Moreover, the longitudinal direction 1*d* of the robotic work tool 1 is parallel to a forward moving direction fd of the robotic work tool 1 as well as a reverse moving direction rd of the robotic work tool 1.

Furthermore, in FIG. 1 and FIG. 2, a lateral direction 1*a* of the robotic work tool 1 is indicated. The lateral direction 1*a* of the robotic work tool 1 is perpendicular to the longitudinal direction 1*d* of the robotic work tool 1. Moreover, the lateral direction 1*a* is parallel to a ground plane gP, and thus also to a ground surface 13, when the robotic work tool 1 is positioned onto a flat ground surface 13. Furthermore, the lateral direction 1*a* of the robotic work tool 1 is perpendicular to the forward moving direction fd of the robotic work tool 1 as well as the reverse moving direction rd of the robotic work tool 1.

According to the illustrated embodiments, the drive wheels 61 of the robotic work tool 1 are non-steered wheels having a fix rolling direction in relation to the tool chassis 1'. The respective rolling direction of the drive wheels 61 of the robotic work tool 1 is substantially parallel to the longitudinal direction 1*d* of the robotic work tool 1. According to the illustrated embodiments, the support wheels 63 are non-driven wheels. Moreover, according to the illustrated embodiments, the support wheels 63 can pivot around a respective pivot axis such that the rolling direction of the respective support wheel 63 can follow a travel direction of the robotic work tool 1.

As understood from the above, when the drive wheels 61 of the robotic work tool 1 are rotated at the same rotational velocity in a forward rotational direction, and no wheel slip is occurring, the robotic work tool 1 will move in the forward moving direction fd indicated in FIG. 1 and FIG. 2. Likewise, when the drive wheels 61 of the robotic work tool 1 are rotated at the same rotational velocity in a reverse rotational direction, and no wheel slip is occurring, the robotic work tool 1 will move in the reverse moving direction rd indicated in FIG. 1 and FIG. 2. The reverse moving direction rd is opposite to the forward moving direction fd.

According to the illustrated embodiments, the robotic work tool 1 may be referred to as a four-wheeled front wheel driven robotic work tool 1. According to further embodiments, the robotic work tool 1 may be provided with another number of wheels 61, 63, such as three wheels. Moreover, according to further embodiments, the robotic work tool 1 may be provided with another configuration of driven and non-driven wheels, such as a rear wheel drive or an all-wheel drive.

According to the illustrated embodiments, the robotic work tool 1 comprises a control arrangement 21. The control arrangement 21 may be configured to control propulsion of the robotic work tool 1, and steer the robotic work tool 1, by controlling electrical motors of the robotic work tool 1 arranged to drive the drive wheels 61 of the robotic work tool 1. According to further embodiments, the control arrangement 21 may be configured to steer the robotic work tool 1 by controlling the angle of steered wheels of the robotic work tool 1. According to still further embodiments, the robotic work tool may be an articulated robotic work tool, wherein the control arrangement 21 may be configured to steer the robotic work tool by controlling the angle between frame portions of the articulated robotic work tool.

The control arrangement 21 may be configured to control propulsion of the robotic work tool 1, and steer the robotic work tool 1, so as to navigate the robotic work tool 1 in an area to be operated. The robotic work tool 1 may further comprise one or more sensors 12, 12' arranged to sense a magnetic field of a wire, and/or one or more positioning units, and/or one or more sensors arranged to detect an impending or ongoing collision event with an object. In addition, the robotic work tool 1 may comprise a communication unit connected to the control arrangement 21. The communication unit may be configured to communicate with a remote communication unit 19 to receive instructions therefrom and/or to send information thereto. The communication may be performed wirelessly over a wireless connection such as the internet, or a wireless local area network (WLAN), or a wireless connection for exchanging data over short distances using short wavelength, i.e., ultra-high frequency (UHF) radio waves in the industrial, scientific, and medical (ISM) band from 2.4 to 2.486 GHz.

As an alternative, or in addition, the control arrangement 21 may be configured to obtain data from, or may comprise, one or more positioning units utilizing a local reference source, such as a local sender and/or a wire, to estimate or verify a current position of the robotic lawnmower 1. As another example, the robotic tool 1 may comprise one or more of a Radio Detection and Ranging (radar) sensor, a Light Detection and Ranging (lidar) sensor, an image capturing unit, such as a camera, an ultrasound sensor, or the like.

The control arrangement 21 may be configured to control propulsion of the robotic tool 1, and steer the robotic tool 1, so as to navigate the robotic tool 1 in a systematic and/or random pattern to ensure that an area is completely covered, using input from one or more of the above-described sensors and/or units.

According to the illustrated embodiments, the robotic tool 1 comprises a cutting unit 15. The cutting unit 15 is configured to cut grass during operation of the robotic tool 1. Moreover, according to the illustrated embodiments, the robotic tool 1 comprises an electric motor configured to power the cutting unit 15. The electric motor is not indicated in FIG. 2 for reasons of brevity and clarity. The robotic tool 1 may comprise more than one cutting unit 15 and more than one electric motor for powering a cutting unit of the robotic tool 1.

The robotic tool 1 further comprises a battery 5. The robotic tool 1 may comprise more than one battery 5. Therefore, the battery 5 indicated in FIG. 2 is in some places herein referred to as the one or more batteries 5. The one or more batteries 5 of the robotic tool 1 is configured to supply electricity to electrical components of the robotic tool 1 during operation of the robotic tool 1, such as to one or more propulsion motors, one or more electric motors for powering a cutting unit 15, the control arrangement 21, and the like.

The one or more batteries 5 is/are chargeable via the docking station 8. In FIG. 2, the robotic tool 1 is illustrated as positioned in the docking station 8. According to the illustrated embodiments, the docking station 8 comprises a docking station plate 8' wherein the each of the support members 61, 62 of the robotic tool 1 abut against the docking station plate 8'. Therefore, in FIG. 2, the robotic tool 1 can be said to be illustrated as positioned on the docking station 8.

The control arrangement 21 may be configured to verify that the robotic tool 1 is located on or at the docking station 8 for example using input from the one or more proximity sensors 12, 12'. That is, as can be seen in FIG. 1, according to the illustrated embodiments, the docking station 8 comprises two magnetic field generating units 31, 32 each configured to generate a magnetic field. The two magnetic field generating units 31, 32 are arranged at different positions on the docking station 8. In more detail, the docking station 8 according to the illustrated embodiments comprises a first magnetic field generating unit 31 arranged in the docking station plate 8' and a second magnetic field generating unit 32 arranged in a stem of the docking station 8.

According to the illustrated embodiments, the control arrangement 21 is configured to verify that the robotic tool 1 is located on or at the docking station 8 using input from the proximity sensors 12, 12', which each is arranged to sense a magnetic field generated by the two magnetic field generating units 31, 32.

The docking station 8 comprises a number of electrical contacts 4 and a cable 17 for connection to an external electric power source, such as an electric power grid. Moreover, the docking station 8 comprises a charging unit configured to transfer electricity from the cable 17 to the number of electrical contacts 4. The charging unit may reduce the voltage supplied from the cable 17 to the number of electrical contacts 4.

The robotic tool 1 comprises a contact unit 14 comprising a number of contact plates configured to transfer electricity from a contact 4 of a docking station 8 to the one or more rechargeable batteries 5, as is further explained herein.

In FIG. 2, the robotic tool 1 is illustrated in a position relative to the docking station 8 in which the robotic tool 1 stands on the docking station plate 8' but with no abutting contact between the number of electrical contacts 4 of the docking station 8 and the contact plates of the contact unit 14 of the robotic tool 1. This position of the robotic tool 1 relative to the docking station 8 may be referred to as a partially docked position.

Figure 3:
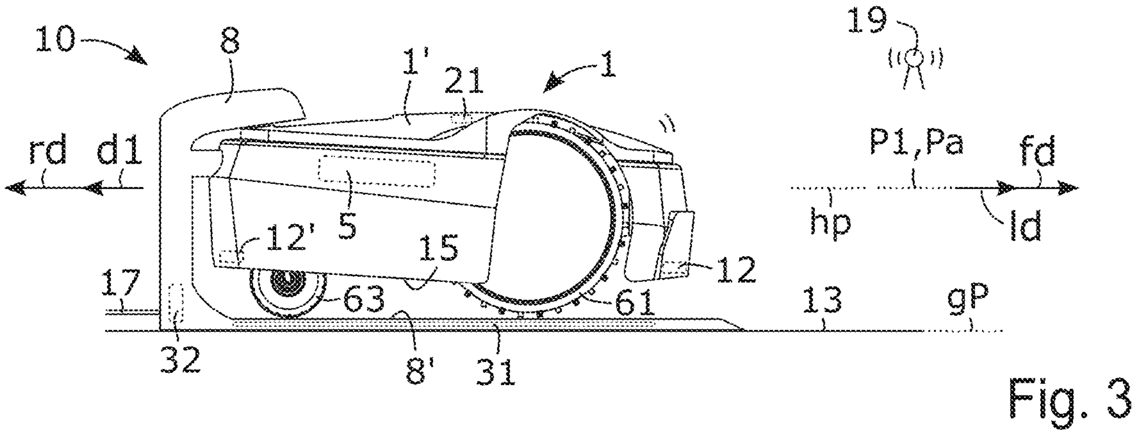
FIG. 3 illustrates the robotic tool system illustrated in FIG. 2, in which a robotic tool has moved in a docking direction relative to a docking station from a position illustrated in FIG. 2 to a docked position.

FIG. 3 illustrates the robotic tool system 10 illustrated in FIG. 2, in which the robotic tool 1 has moved in a docking direction d1 relative to the docking station 8 from the partially docked position illustrated in FIG. 2 to a docked position. In the docked position, the number of contact plates of the robotic tool 1 are abutting against the electrical contacts of the docking station 8. This position of the robotic tool 1 relative to the docking station 8 may also be referred to as a fully docked position.

Figure 4:
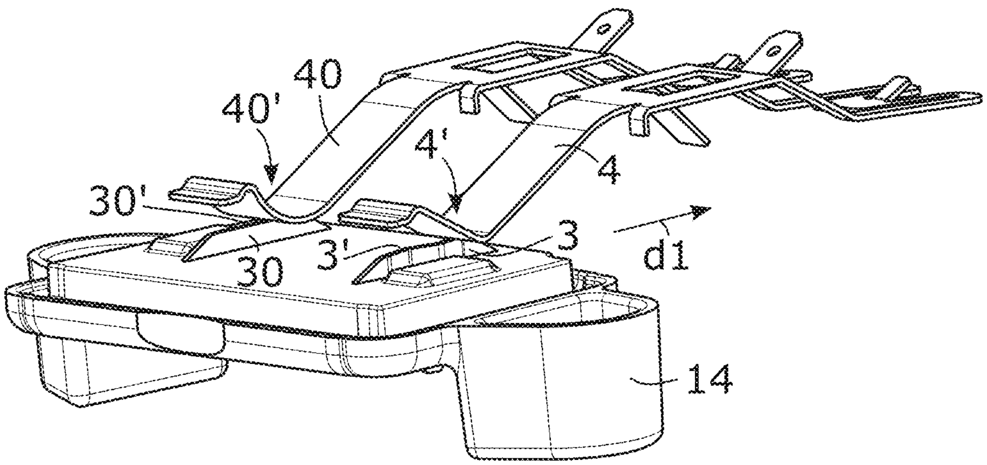
FIG. 4 illustrates a perspective view of a contact unit of the robotic tool illustrated in FIG. 1-FIG. 3, and two electrical contacts of the docking station illustrated in FIG. 2 and FIG. 3.

FIG. 4 illustrates a perspective view of the contact unit 14 of the robotic tool 1 illustrated in FIG. 2 and FIG. 3, and two electrical contacts 4, 40 of the docking station 8 illustrated in FIG. 1-FIG. 3. Below, simultaneous reference is made to FIG. 1-FIG. 4, if not indicated otherwise.

The contact unit 14 is configured to be mounted to the tool chassis 1' of the robotic tool 1 illustrated in FIG. 1-FIG. 3. According to these embodiments, the contact unit 14 is arranged inside an aperture 16 of the tool chassis 1' of the robotic tool 1. Moreover, according to the illustrated embodiments, the contact unit 14 is arranged at a rear section of the robotic tool 1. However, according to further embodiments, the contact unit 14 may be arranged at another location of the robotic tool 1.

That is, in more detail, according to the illustrated embodiments, the docking direction d1 coincides with the reverse moving direction rd of the robotic tool 1. Therefore, according to the illustrated embodiments, the control arrangement 21 is configured to propel the robotic tool 1 in the reverse moving direction rd of the robotic tool 1 in a docking procedure of the robotic tool 1 into the docking station 8.

According to the illustrated embodiments, the control arrangement 21 propels the robotic tool 1 in the reverse moving direction rd indicated in FIG. 1-FIG. 3 by rotating the drive wheels 61 of the robotic work tool 1 at the same rotational velocity in a reverse rotational direction. In this manner, the robotic tool 1 is moved in the docking direction d1 relative to the docking station 8 in the docking procedure of the robotic tool 1 into the docking station 8.

However, according to further embodiments, the docking direction d1, as referred to herein, may coincide with another direction of the robotic tool 1, such as the forward moving direction fd, a lateral direction 1*a*, or the like. According to such embodiments, the control arrangement may be configured to propel the robotic tool 1 in the docking direction d1 in another manner than described above.

The docking direction d1 is also indicated in FIG. 4. The contact unit 14 comprises a contact plate 3 according to the present disclosure. The contact plate 3 comprises an edge surface 3'. The edge surface 3' of the contact plate 3 extends along an abutment plane Pa. The abutment plane Pa is indicated in FIG. 1-FIG. 3.

The edge surface 3' of the contact plate 3 is configured to abut against a contact 4 of the docking station 8 upon movement of the robotic work tool 1 relative to the docking station 8 along the docking direction d1. An abutment section 4' of the contact 4 of the docking station 8 is biased against the edge surface 3' of the contact plate 3. The contact plate 3 of the robotic tool 1 and the contact 4 of the docking station 8 may be referred to as a first pair of electrical contacts. The contact plate 3 may be electrically connected to the one or more rechargeable batteries 5 of the robotic tool 1 via a battery charging module.

The contact unit 14 of the robotic tool 1 further comprises a second contact plate 30 comprising an edge surface 30'. Moreover, a second electrical contact 40 of the docking station 8 can be seen. The second contact plate 30 of the robotic tool 1 and the second contact 40 of the docking station 8 may be referred to as a second pair of electrical contacts.

The second contact plate 30 of the robotic tool 1 is a prior-art contact plate 30 which has been illustrated for the purpose of pointing out the differences between the contact plate 3 according to the present disclosure and the prior-art contact plate 30. Likewise, the second electrical contact 40 of the docking station 8 is a prior-art electrical contact 40 which has been illustrated for the purpose of pointing out the differences between the contact 4 of the docking station 8 according to the present disclosure and the prior-art electrical contact 40. In the following, the second contact plate 30 of the robotic tool 1 is referred to as the prior-art contact plate 30. Likewise, the second electrical contact 40 of the docking station 8 is referred to as the prior-art electrical contact 40.

According to embodiments herein, the robotic tool 1 may comprise a second contact plate being identical to the contact plate 3 illustrated in FIG. 4 instead of the prior-art contact plate 30 illustrated in FIG. 4. Likewise, the docking station 8 may comprise a second contact being identical to the contact 4 illustrated in FIG. 4 instead of the prior-art electrical contact 40 illustrated in FIG. 4.

Figure 5:
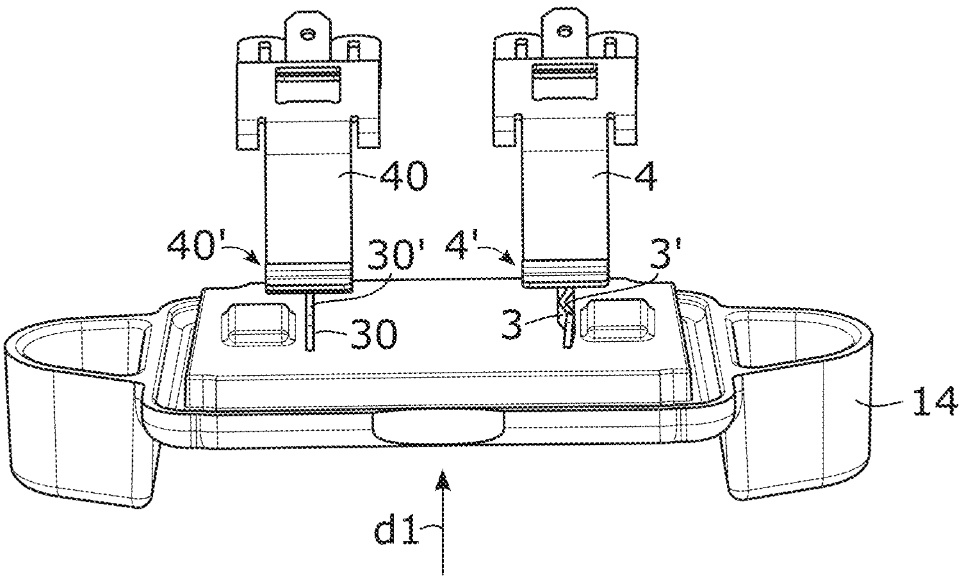
FIG. 5 illustrates a second view of the contact unit and the two electrical contacts of the docking station illustrated in FIG. 4.

FIG. 5 illustrates a second view of the contact unit 14 and the two electrical contacts 4, 40 of the docking station 8 illustrated in FIG. 4. In FIG. 5, the contact unit 14 and the two electrical contacts 4, 40 are illustrated in a viewing direction being parallel to the docking direction d1. Below, simultaneous reference is made to FIG. 1-FIG. 5, if not indicated otherwise.

The contact 4 of the docking station 8 comprises an abutment section 4'. The abutment section 4' of the contact 4 of the docking station 8 is configured to abut and slide against the edge surface 3' of the contact plate 3 of the robotic tool 1 upon movement of the robotic work tool 1 relative to the docking station 8 along the docking direction d1.

As can be seen in FIG. 4 and FIG. 5, the contact plate 3 according to the present disclosure comprises a number of sections each being angled relative to the docking direction d1, whereas the prior art contact plate 30 is substantially straight as seen along the docking direction d1.

Due to the features of the contact plate 3 according to the present disclosure, any matter, such as dirt, debris, and cutting residues on the edge surface 3' of the contact plate 3, and/or on the contact 4 of the docking station, can be scraped off and can be removed during the movement of the robotic work tool 1 in the docking direction d1 relative to the docking station 8. In this manner, an electrical contact between the contact plate 3 and the contact 4 of the docking station can be further ensured.

Furthermore, due to the number of sections of the contact plate 3 each being angled relative to the docking direction d1, a more evenly distributed wear and tear of contact 4 of the docking station 8 can be provided.

Thus, due to the features of the contact plate 3 of the robotic work tool 1, a robotic work tool 1 is provided in which electrical contact between the contact plate 3 thereof and a contact 4 of the docking station 8 can be further ensured in a simple and cost-efficient manner. As a further result thereof, a robotic work tool 1 is provided having conditions for an improved operational reliability in a simple and cost-efficient manner.

Figure 6A:
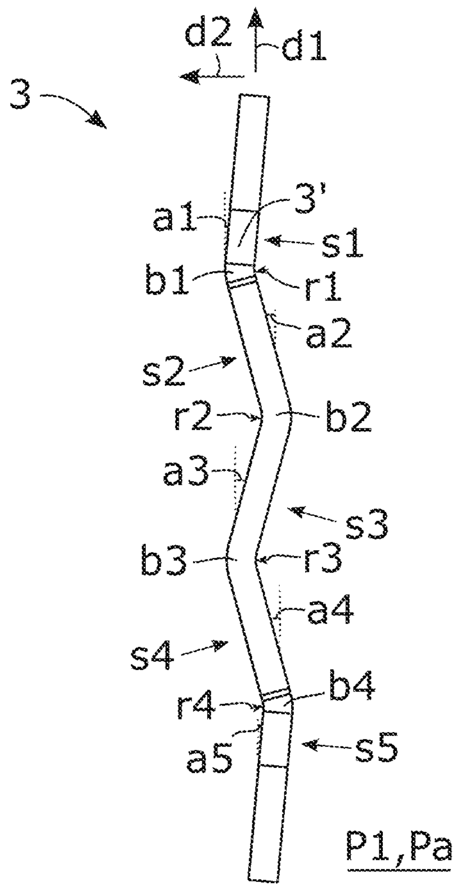
FIG. 6*a* illustrates a first enlarged view of a contact plate illustrated in FIG. 4 and FIG. 5.

FIG. 6*a* illustrates a first enlarged view of the contact plate 3 illustrated in FIG. 4 and FIG. 5. In FIG. 6*a*, the contact plate 3 is illustrated in a viewing direction perpendicular to the docking direction d1 and in a direction perpendicular to the abutment plane Pa. Below, simultaneous reference is made to FIG. 1-FIG. 6*a*, if not indicated otherwise.

In FIG. 6*a*, the number of sections s1-s5, b1-b4 each being angled relative to the docking direction d1 are indicated and can be clearly seen. According to the illustrated embodiments, each section s1-s5, b1-b4 of the number of sections s1-s5, b1-b4 is angled relative to the docking direction d1 with an angle a1-a5 measured in a plane P1 parallel to the abutment plane Pa.

In more detail, according to the illustrated embodiments, the contact plate 3 comprises a number of bent sections b1-b4, wherein each bent section b1-b4 of the number of bent sections b1-b4 has a radius of curvature r1-r4 measured in a plane P1 parallel to the abutment plane Pa. According to the illustrated embodiments, the contact plate 3 comprises four bent sections b1-b4. However, according to further embodiments, the contact plate 3 may comprise another number of bent sections b1-b4, such as a number between one and twenty.

Moreover, according to the illustrated embodiments, the contact plate 3 comprises a number of straight sections s1-s5, wherein each bent section b1-b4 connects two straight sections s1-s5 of the number of straight sections s1-s5. In more detail, according to the illustrated embodiments, the contact plate 3 comprises five straight sections s1-s5, wherein each of the four bent sections b1-b4 connects two straight sections s1-s5.

The contact plate 3 may comprise at least two straight sections s1-s5 and at least one bent section b1-b4, and wherein each bent section b1-b4 of the at least one bent section b1-b4 connects two straight sections s1-s5 of the least two straight sections s1-s5.

As an alternative, the contact plate 3 may comprise at least three straight sections s1-s5 and at least two bent sections b1-b4, and wherein each bent section b1-b4 of the at least two bent sections b1-b4 connects two straight sections s1-s5 of the least three straight sections s1-s5.

Moreover, according to further embodiments, the contact plate 3 may comprise a number of straight sections s1-s5 being an integer within the range of one to twenty-one.

As clearly seen in FIG. 6*a*, according to the illustrated embodiments, the number of straight and bent sections s1-s5, b1-b4 of the contact plate 3 together form a zigzag shape of the contact plate 3. Moreover, according to the illustrated embodiments, each of the straight sections s1-s5 of the contact plate 3 is angled relative to the docking direction d1 with an angle a1-a5 within the range of 5.5-15 degrees, measured in a plane P1 parallel to the abutment plane Pa. According to further embodiments, each of the straight sections s1-s5 of the contact plate 3 may be angled relative to the docking direction d1 with an angle a1-a5 within the range of 1-75 degrees, or within the range of 3-45 degrees, measured in a plane P1 parallel to the abutment plane Pa.

Figure 6B:
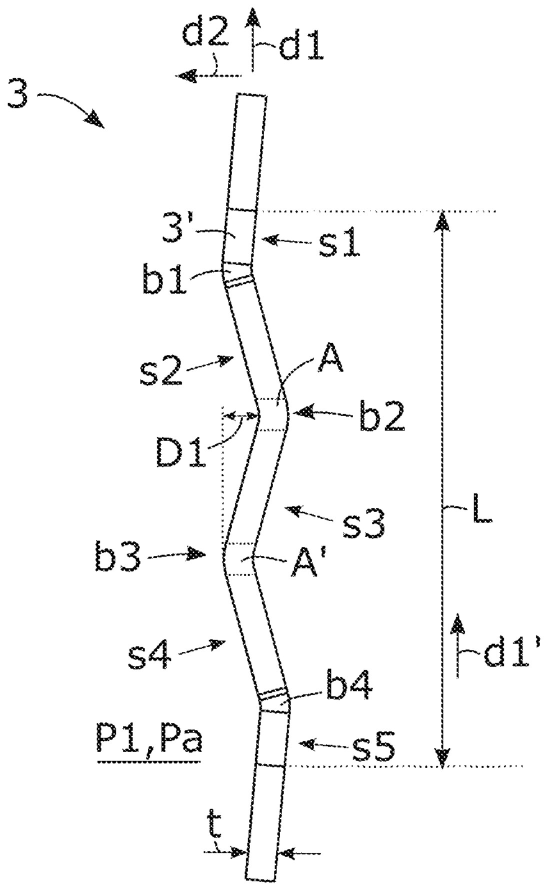
FIG. 6*b* illustrates a second enlarged view of the contact plate illustrated in FIG. 6*a*.

FIG. 6*b* illustrates a second enlarged view of the contact plate 3 illustrated in FIG. 6*a*. Also in FIG. 6*b*, the contact plate 3 is illustrated in a viewing direction perpendicular to the docking direction d1 and in a direction perpendicular to the abutment plane Pa. Below, simultaneous reference is made to FIG. 1-FIG. 6*b*, if not indicated otherwise.

As is indicated in FIG. 6*b*, the thickness t of the contact plate 3, measured in a direction d2 perpendicular to the docking direction d1 and parallel to the abutment plane Pa, is considerable smaller than the length L of the edge surface 3', measured in a direction d1' parallel to the docking direction d1. In more detail, according to the illustrated embodiments, the thickness t of the contact plate 3, measured in a direction d2 perpendicular to the docking direction d1 and parallel to the abutment plane Pa, is approximately 5.3% of the length L of the edge surface 3', measured in a direction d1' parallel to the docking direction d1. According to further embodiments, the thickness t of the contact plate 3, measured in a direction d2 perpendicular to the docking direction d1 and parallel to the abutment plane Pa, may be less than 10% of the length L of the edge surface 3', measured in a direction d1' parallel to the docking direction d1.

Due to these features, it can be further ensured that any matter on the edge surface 3' of the contact plate 3 can be scraped off and can be removed during the movement of the robotic work tool 1 in the docking direction d1 relative to the docking station 8.

Since the contact plate 3 comprises the number of sections s1-s5, b1-b4 each being angled relative to the docking direction d1, a contact area A, A' between the contact plate 3 and the contact 4 of the docking station 8 will move in a direction d2 perpendicular to the docking direction d1 upon movement of the robotic work tool 1 relative to the docking station 8 along the docking direction d1.

As indicated in FIG. 6*b*, the edge surface 3' of the contact plate 3 is configured such that a contact area A, A' between the contact plate 3 and the contact 4 of the docking station 8 moves a first distance D1 along the direction d2 perpendicular to the docking direction d1 upon the movement of the robotic work tool 1 in the docking direction d1 relative to the docking station 8, and wherein the first distance D1 is greater than the thickness t of the contact plate 3, measured in a direction d2 perpendicular to the docking direction d1 and parallel to the abutment plane Pa. According to further embodiments, the first distance D1 may be equal to the thickness t of the contact plate 3, measured in the direction d2 perpendicular to the docking direction d1 and parallel to the abutment plane Pa.

Thereby, it can be even further ensured that any matter on the edge surface 3' of the contact plate 3, and/or on the contact 4 of the docking station 8, can be removed in an efficient manner during movement of the robotic work tool 1 in the docking direction d1 relative to the docking station 8. This is because any matter on the edge surface 3' of the contact plate 3 which is pushed along the edge surface 3' by the abutment section 4' of the contact 4 of the docking station 8 will reach an edge of the edge surface 3' upon the movement of the robotic work tool 1 in the docking direction d1 relative to the docking station 8. As a result, an electrical contact between the contact plate 3 and the contact 4 of the docking station 8 can be further ensured.

Moreover, the number of sections s1-s5, b1-b4 each being angled relative to the docking direction d1 lower the probability of an abutting contact between the edge surface 3' of the contact plate 3 and an unused and oxidized area of the contact 4 of the docking station 8 when the robotic work tool 1 stops after movement in the docking direction d1. In this manner, an electrical contact between the contact plate 3 and the contact 4 of the docking station 8 can be further ensured.

The contact plate 3 is plate-like meaning that the contact plate 3 has larger dimensions along a first and a second direction than along a third direction, wherein the first, second, and third directions are perpendicular to each other. According to the illustrated embodiments, the third direction is perpendicular to the docking direction d1 and parallel to the abutment plane Pa and is thus parallel to the direction d2 in which the thickness t of the contact plate 3 is measured. The thickness t of the contact plate 3 corresponds to the width of the edge surface 3' of the contact plate 3 measured in the direction d2 perpendicular to the docking direction d1 and parallel to the abutment plane Pa.

Figure 7:
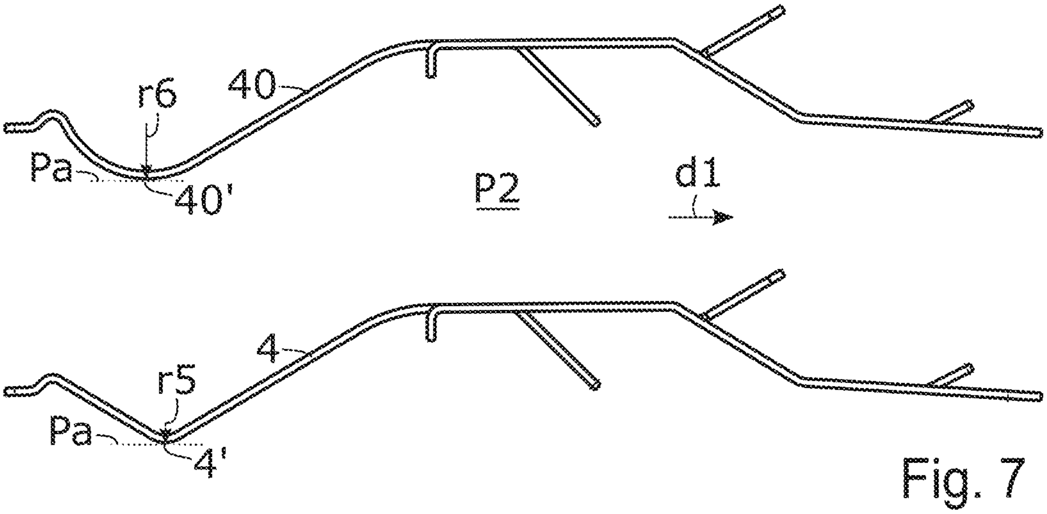
FIG. 7 illustrates a side view of a prior art contact and a side view of a contact according to the present disclosure illustrated in FIG. 4 and FIG. 5.

FIG. 7 illustrates a side view of the prior art contact 40 and a side view of the contact 4 according to the present disclosure illustrated in FIG. 4 and FIG. 5. In FIG. 7, the prior art contact 40 and the contact 4 according to the present disclosure are illustrated in a viewing direction perpendicular to the docking direction d1 and perpendicular to the abutment plane Pa. Below, simultaneous reference is made to FIG. 1-FIG. 7, if not indicated otherwise.

As can be seen in FIG. 7, the abutment section 4' of the contact 4 according to the present disclosure has a considerable smaller radius of curvature r5 measured in a plane P2 perpendicular to the abutment plane Pa, than the radius of curvature r6 of the abutment section 40' of the prior-art contact 40.

In more detail, according to the illustrated embodiments, the contact 4 of the docking station 8 comprises an abutment section 4' having a radius of curvature r5 of approximately 3 mm measured in the plane P2 perpendicular to the abutment plane Pa. The prior-art contact 40 of the docking station 8 comprises an abutment section 40' having a radius of curvature r6 of approximately 10 mm measured in the plane P2 perpendicular to the abutment plane Pa.

According to some embodiments the contact 4 of the docking station 8 may comprises an abutment section 4' having a radius of curvature r5 of less than 8 mm, or less than 4 mm, measured in a plane P2 perpendicular to the abutment plane Pa.

Due to the relatively small radius of curvature r5 of the contact 4 of the docking station 8, any matter, such as dirt, debris, and cutting residues on the edge surface 3' of the contact plate 3 of the robotic work tool 1 can be scraped off in a more efficient manner and can be removed during movement of the robotic work tool 1 in the docking direction d1 relative to the docking station 8. Thereby, an electrical contact between the contact plate 3 of the robotic work tool 1 and the contact 4 of the docking station 8 can be further ensured.

The following is explained with simultaneous reference to FIG. 1-FIG. 7. According to the illustrated embodiments, the edge surface 3' of the contact plate 3 is substantially parallel to the docking direction d1. According to further embodiments, the edge surface 3' may be angled relative to the docking direction d1. Likewise, according to the illustrated embodiments, the abutment plane Pa is substantially parallel to the docking direction d1. However, according to further embodiments, the abutment plane Pa may be angled relative to the docking direction d1.

Furthermore, according to the illustrated embodiments, the docking direction d1 is substantially parallel to a longitudinal direction 1*d* of the robotic work tool 1. However, the docking direction d1 may be angled relative to the longitudinal direction 1*d* of the robotic work tool 1. As an example, the docking direction d1 may be substantially parallel to a lateral direction 1*a* of the robotic work tool 1 or may have an angle relative to each of the longitudinal and the lateral direction 1*d*, 1*a* of the robotic tool 1.

Moreover, according to the illustrated embodiments, the abutment plane Pa is substantially parallel to a lateral direction 1*a* of the robotic work tool 1. However, the abutment plane Pa may be angled relative to the lateral direction 1*a* of the robotic work tool 1.

The wording "substantially parallel to", as used herein, may encompass that the angle between the objects referred to is less than 10 degrees, or is less than 7 degrees.

The wording "substantially straight", as used herein, may encompass that the object referred to deviates less than 10% from the shape of a flat plane.

The contact plate 3 of the robotic tool 1 may also be referred to as an electrical contact plate 3. Likewise, the contact 4 of the docking station 8 may also be referred to as an electrical contact 4.

Since the contact plate 3 comprises the number of sections s1-s5, b1-b4 each being angled relative to the docking direction d1, the edge surface 3' of the contact plate 3 also comprises the number of sections s1-s5, b1-b4 each being angled relative to the docking direction d1.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A robotic work tool configured to operate in an area in an autonomous manner, wherein the robotic work tool comprises:

one or more rechargeable batteries, and a contact plate configured to transfer electricity from a contact of a docking station to the one or more rechargeable batteries, wherein the contact plate comprises an edge surface extending along an abutment plane, the edge surface being configured to abut against the contact upon movement of the robotic work tool along a docking direction, and wherein the contact plate comprises a number of sections each being angled relative to the docking direction with at least one angle in a plane parallel to the abutment plane such that a contact area between the edge surface and the contact moves in a direction orthogonal to the docking direction upon the movement of the robotic work tool in the docking direction.

2. The robotic work tool according to claim 1, comprising a plurality of contact plates.

3. The robotic work tool according to claim 1, wherein the contact plate comprises a number of bent sections.

4. The robotic work tool according to claim 3, wherein each bent section of the number of bent sections has a radius of curvature measured in a plane parallel to the abutment plane.

5. The robotic work tool according to claim 1, wherein the contact plate comprises at least two straight sections and at least one bent section, and wherein each bent section of the at least one bent section connects two straight sections of the at least two straight sections.

6. The robotic work tool according to claim 1, wherein the contact plate comprises at least three straight sections and at least two bent sections, and wherein each bent section of the at least two bent sections connects two straight sections of the at least three straight sections.

7. The robotic work tool according to claim 1, wherein the thickness of the contact plate is less than 10% of a length of the edge surface, measured in a direction parallel to the docking direction.

8. The robotic work tool according to claim 1, wherein the edge surface is configured such that the contact area moves a first distance along a direction perpendicular to the docking direction upon the movement of the robotic work tool in the docking direction, and wherein the first distance is greater than, or equal to, a thickness of the contact plate.

9. The robotic work tool according to claim 1, wherein the edge surface is substantially parallel to the docking direction.

10. The robotic work tool according to claim 1, wherein the abutment plane is substantially parallel to the docking direction.

11. The robotic work tool according to claim 1, wherein the docking direction is substantially parallel to a longitudinal direction of the robotic work tool.

12. The robotic work tool according to claim 1, wherein the abutment plane is substantially parallel to a lateral direction of the robotic work tool.

13. The robotic work tool according to claim 1, wherein the robotic work tool is a self-propelled robotic lawnmower.

14. A robotic tool system comprising a robotic work tool and a docking station, wherein the robotic work tool is configured to operate in an area in an autonomous manner, the robotic work tool comprising:

one or more rechargeable batteries, and a contact plate configured to transfer electricity from a contact of the docking station to the one or more rechargeable batteries, wherein the contact plate comprises an edge surface extending along an abutment plane, the edge surface being configured to abut against the contact of the docking station upon movement of the robotic work tool relative to the docking station along a docking direction, and wherein the contact plate comprises a number of sections each being angled relative to the docking direction with at least one angle in a plane parallel to the abutment plane such that a contact area between the edge surface and the contact of the docking station moves in a direction orthogonal to the docking direction upon the movement of the robotic work tool in the docking direction relative to the docking station.

15. The robotic tool system according to claim 14, wherein the contact of the docking station comprises an abutment section having a radius of curvature of less than 8 mm, measured in a plane perpendicular to the abutment plane.

* * * * *